United States Patent [19]

Van De Wall

[11] 3,878,343

[45] Apr. 15, 1975

[54] SHOCKPROOF TELEPHONE SET

[75] Inventor: LaVerne R. Van De Wall, Rochester, N.Y.

[73] Assignee: Dynalec Corporation, Rochester, N.Y.

[22] Filed: May 7, 1973

[21] Appl. No.: 357,668

[52] U.S. Cl. .......... 179/100 R

[51] Int. Cl. .......... H04m 1/02

[58] Field of Search .......... 179/100 R, 100 L, 100 C, 179/146 R

[56] References Cited

UNITED STATES PATENTS

| | | | |
|---|---|---|---|
| 2,826,641 | 3/1958 | Sargisson et al. | 179/100 R |
| 3,306,986 | 2/1967 | Klein | 179/100 R |

*Primary Examiner*—William C. Cooper
*Attorney, Agent, or Firm*—Samuel R. Genca

[57] ABSTRACT

A shockproof telephone set is disclosed wherein a pair of cradles both of which have openings along a longitudinal axis of a frame are adapted to receive a telephone handset endwise and cooperate with a spring biased slide bracket having a wedge portion or retainer portion inclined toward said frame and said pair of cradles and movable along the longitudinal axis of the frame to urge the handset along its axis at one end thereof into the pair of cradles. A bracket locking means coacts with the slide bracket for automatically locking the wedge portion or retainer portion in a closed predetermined position so that the handset is in turn locked in the pair of cradles when disposed therein. A slide bracket detent means for detenting the wedge portion or retainer portion in an open predetermined position for endwise ingress and egress of the handset from the pair of cradles coacts with the slide bracket. The detent means is responsive to the handset being returned to the pair of cradles for automatically restoring the wedge portion to the closed position thereby locking the handset within the pair of cradles on the frame and preventing the displacement of the handset by an external force or vibration.

8 Claims, 11 Drawing Figures

SHOCKPROOF TELEPHONE SET

BACKGROUND OF THE INVENTION

1. Field of Invention

The present invention relates to telephone instruments or sets and more particularly to a shockproof telephone set which can be mounted either in a horizontal or vertical position in a mobile vehicle or vessel.

2. Prior Art

A problem of long standing in the telephone art is that of providing a telephone instrument or set which may be mounted vertically or substantially horizontally in a mobile vehicle or vessel and having a handset which can be affixed or locked to a base or frame to withstand accidental displacement thereof by shock, an external force or some jarring acting on the instrument. The problem is even more critical for telephone sets having a handset which may readily be removed from the base or frame with one hand. In the past, attempts have included means which are dependent upon the shape of the handset to lock the handset to the base. For example, the handset of the past included a handle with transmitter and receiver at the opposite end of a handle which transmitter and receiver were tilted inwards so that two brackets affixed to the telephone base could be moved away from each other and hooked between the transmitter and receiver to lock the handset to the base. Other attempts included a single cradle and spring bracket for spring clamping one end of the handset to the cradle, while the other end of the handset hung freely in a vertical position. While prior art attempts did work satisfactorily within certain guarded conditions, they did not fulfill all the requirements for providing a shockproof telephone set which could sustain an external force, shock or jarring such as that experienced in mobile vehicles, sea going vessels or space ships. In recent years, the problems have even become more acute with the advent of telephone handsets having fairly smooth configurations without overhanging appendages which were previously used for the clamping of the handset to the base of the telephone instrument. Further, with the present use of push button dialing in the handset, the prior art means for locking the handset to the base does not appear to be usable.

Accordingly, there is a pressing need for a shockproof handset that will not only withstand an external force, shock or vibration, but can also be mounted in a horizontal or vertical position in a mobile vehicle, ship or vessel.

It is an object of this invention to provide a novel shockproof telephone set for mobile vehicles or vessels.

It is also an object of the present invention to provide a new and improved shockproof telephone set for preventing the accidental displacement of the handset under extreme conditions such as shock, jarring, vibrations or external forces.

It is yet another object of the invention to provide a novel shockproof telephone set which solves the aforesaid problems of the prior art.

SUMMARY OF THE INVENTION

Briefly described, a shockproof telephone instrument or set in accordance with a preferred embodiment of the invention features a frame having an upper or first cradle and a lower or second cradle both dished upward along a frame vertical longitudinal axis and adapted to receive a telephone handset endwise therein. The telephone instrument or set can be preferably wall mounted in a vertical position or alternatively desk mounted in a substantially horizontal position and includes a slide bracket which is slideable within the frame along a channel disposed along the frame longitudinal axis. The slide bracket includes a wedge portion or retainer portion dished inclined toward said frame and said cradles along said frame vertical axis and is spring biased toward said cradles so as to urge and wedge the telephone handset along its axis into the upper and lower cradles. The wedge portion or retainer portion may be held in an open position by a detent means for endwise ingress and egress of the handset when the wedge portion or retainer portion is moved to a predetermined open position along the channel and is automatically restored to the closed position in response to the handset being returned to the upper and lower cradles. The wedge portion or retainer portion is locked in the closed position by a spring biased locking means which coacts with a notch in the slide bracket when it is disposed in a given position within the channel. The locking means may be moved from the notch so that the handset may be removed from the upper and lower cradles by upward endwise movement of the handset toward the retainer portion.

DESCRIPTION OF THE DRAWINGS

The invention both as to its organization and method of operation, will best be understood by reference to the following description taken in connection with the accompanying drawings in which.

DETAILED DESCRIPTION OF THE PREFERRED EMODIMENT

Figures 1, 2, 3, 4:
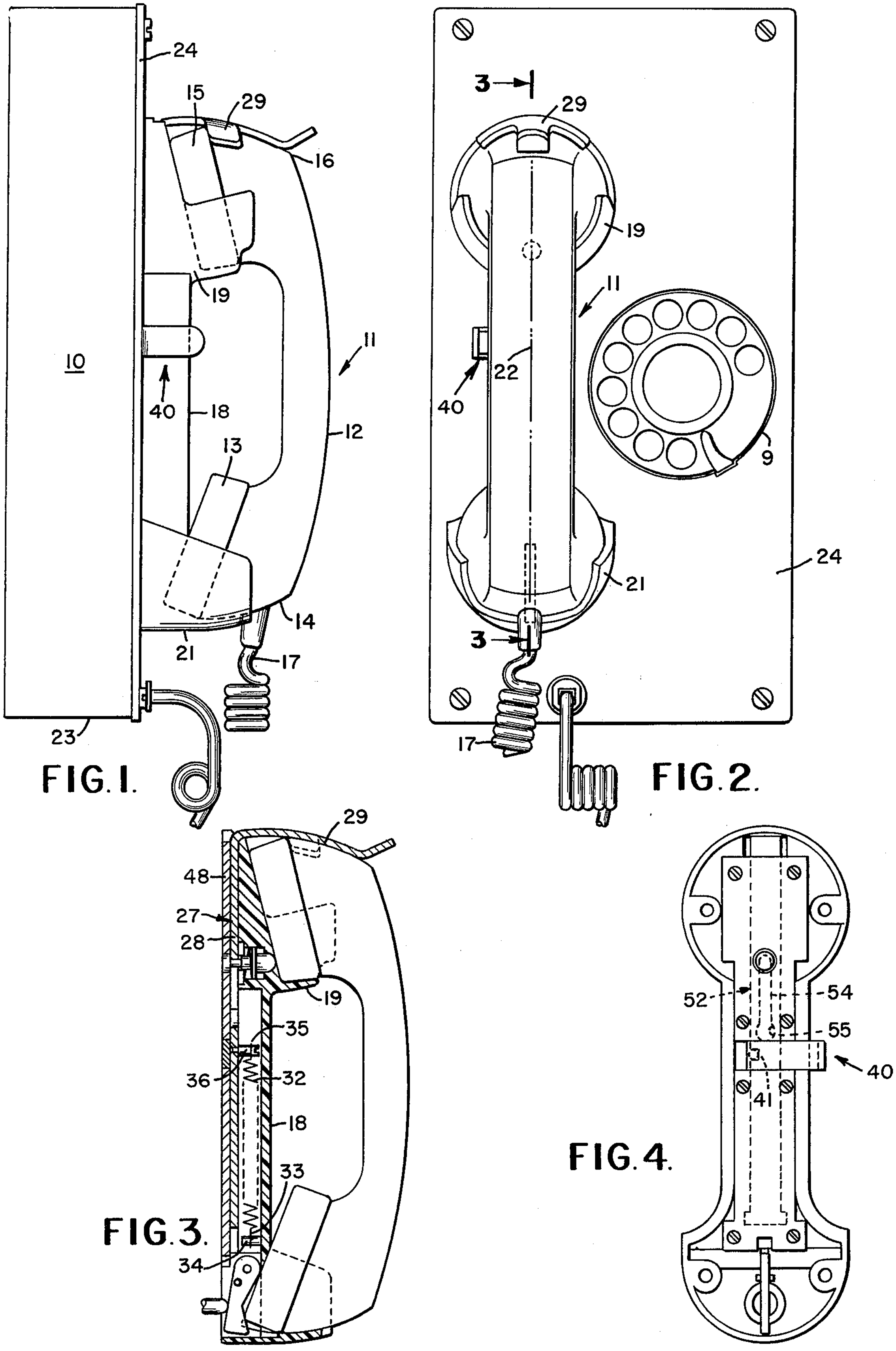
FIG. 1 is a side view of a shockproof telephone set mounted in a vertical position with its handset at rest and locked in a closed position in accordance with a preferred embodiment of the invention.
FIG. 2 is a front view of the shockproof telephone set of FIG. 1.
FIG. 3 is a longitudinal cross-sectional side view of the telephone set taken along line 3—3 of FIG. 2.
FIG. 4 is a rear view of the telephone set shown in FIGS. 1 to 3.

Referring first to FIGS. 1–10, a shockproof telephone set 10 is shown in accordance with a preferred embodiment of the invention in a vertical position. The telephone set 10 includes a handset 11 having a longitudinal handle 12 with a transmitter 13 at one end 14 and a receiver 15 at the opposite end 16. The handset 11 is of the well known type and includes a cord 17 at end 14. It should be understood that while the present invention utilizes a conventional telephone handset 11, other handsets also known to the art may be utilized with the present invention, for example, handsets which have push button dialing therein may also be used in the present invention as will be shown later herein. The handset 11 is shown mounted in a secured, locked or closed position within the telephone set 10 in FIGS. 1–3 to withstand shock vibration or external forces acting on the telephone set 10. This is accomplished by a frame 18 having a first or upper cradle 19 and a second or lower cradle 21 disposed along a longitudinal vertical axis 22 of the frame 18. The upper cradle 19 and lower cradle 21 are both dished upward to receive the handset 11 endwise therein. Under normal use, that is telephones which are normally used in an office, home or factory, the upper cradle 19 and the lower cradle 21 are adequate for holding the handset 11 at rest on the frame 18. The frame 18 is mounted on a vertical base 23 having a plate 24 for vertical wall mounting of the telephone set 10 as shown in FIGS. 1–3. The frame 18 however, may also be mounted on a substantially horizontal base 25 having a plate 26 for horizontal desk mounting of the telephone set 10 as shown in FIG. 11 without departing from the invention.

In accordance with the invention, the handset 11 is secured and locked within the upper cradle 19 and lower cradle 21 of the frame 18 at a rest position by a slide bracket 27 having a slide portion 28 and a wedge portion or retainer portion 29. The slide portion 28 is slideable along the frame longitudinal axis 22 within a channel or groove 31 within the frame 18. The wedge portion 29 is dished downward opposed to the upper cradle 19 so that the receiver end 16 and transmitter end 14 of the handset 11 are held captive at rest within the upper cradle 19 and lower cradle 21 respectively as shown in FIGS. 1–3. The slide bracket 27 is spring biased along the frame longitudinal axis 22 within channel 31 by a tension spring 32 which is fixed at one end 33 to a retaining pin 34 extending from the frame 18 and at the other end 35 by another retaining pin 36 affixed to the slide portion 28 of the slide bracket 27 so that the slide bracket 27 and wedge portion or retainer portion 29 are constantly urged downward toward the upper cradle 19 and lower cradle 21 along the frame longitudinal axis 24. With this arrangement between the slide bracket 27, the upper cradle 19, lower cradle 21, and the wedge portion or retainer portion 29, the handset 11 is urged and wedged along its longitudinal axis into the cradles 19 and 21. Thus, depending upon the spring constant and force exerted by the spring 32, the handset 11 can withstand an accidental displacement of the handset 11 from the cradles 19, 21 by an external force or shock. However, to further insure the locking and securing of the handset 11 and to retain the slide bracket 27 in the closed, secured or locked position, the shockproof telephone set 10 includes a bracket locking means 40, details of which are shown in FIGS. 1–9 and are more particularly shown in the enlarged cross-sectional views in FIGS. 8 and 9. The bracket locking means 40 includes a notch 41 in the slide portion 28 which is engaged by a pin 42 mounted on a transverse slide member 43 which is spring biased away from the frame 18 by a spring 44 disposed in a hole 45 in the frame 18 and a sleeve 46 fixed to member 43. The pin 42 in turn is spring biased towards the slide portion 28 and the notch 41 by the spring 44. Normally, the pin 42 is urged toward the slide portion 28 and drops or falls within the notch 41 when the slide bracket 27 achieves a predetermined position along the frame longitudinal axis 22 of the frame 18 within channel 31. When the slide bracket 27 achieves this predetermined closed position, the wedge portion or retainer portion 29 captures the end 16 of the handset 11 into the upper cradle 19 and lower cradle 21 by transmitting a force along the longitudinal axis of the frame 22 and the longitudinal axis of the handset 11 to insure the seating and wedging of the handset 11 into the lower cradle 21, thereby locking the handset 11 within the cradles 19, 21 as aforesaid. To remove the handset 11 from the upper and lower cradles 19, 21 respectively, the handset 11 is moved upward against the wedge portion or retainer portion 29 after the pin 42 is pushed out of the notch 41 by a sidewise movement of the slide member 43. Since the slide bracket 27 normally returns to the closed or locked position by the force exerted by the spring 32, the telephone set 10 includes a bracket detent means 50 for holding the wedge portion or retainer portion 29 in the open position.

Figure 5:
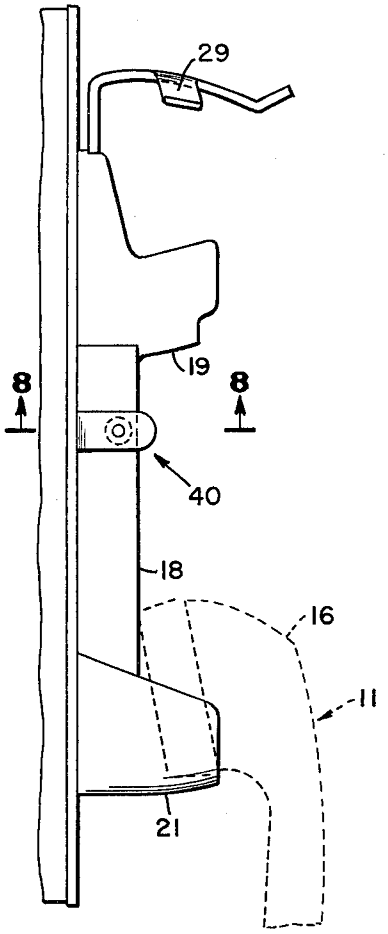
FIG. 5 is a fragmentary side view of the telephone set of FIG. 1 in an open position showing its handset removed.
Figure 6:
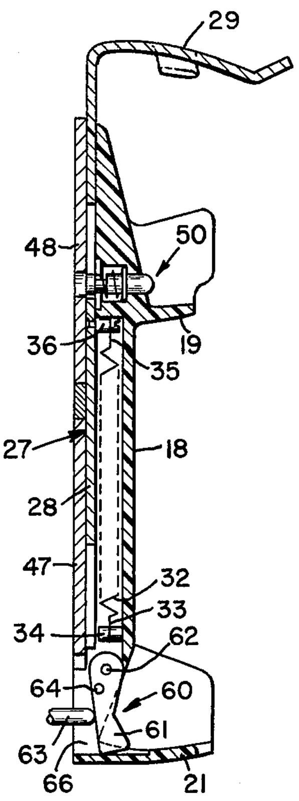
FIG. 6 is a longitudinal cross-sectional side view of the telephone set similar to FIG. 3 except that the telephone set is in an open position and the handset is removed.
Figure 7:
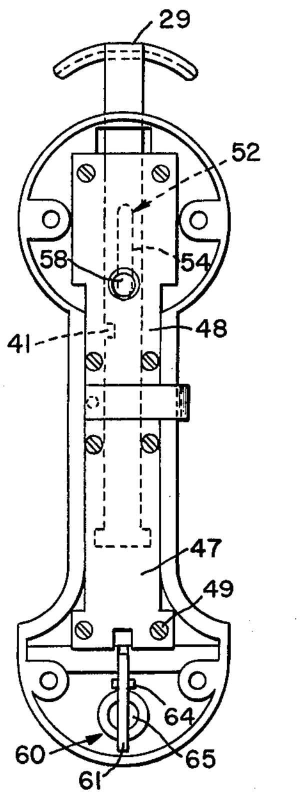
FIG. 7 is a rear view of the telephone set similar to FIG. 4 showing the telephone set in an open position.
Figure 8:
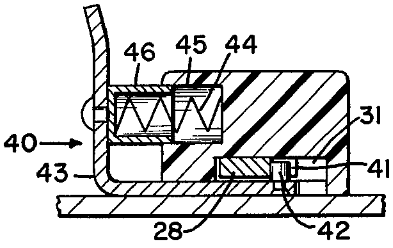
FIGS. 8 and 9 are cross-sectional views of a telephone set taken along line 8 and transverse to the longitudinal axis of the telephone set.
Figure 9:
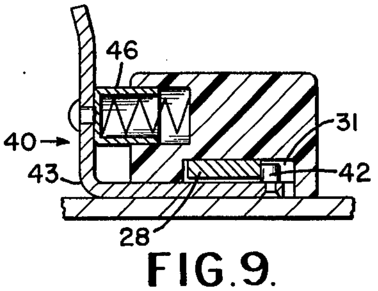
Figure 10:
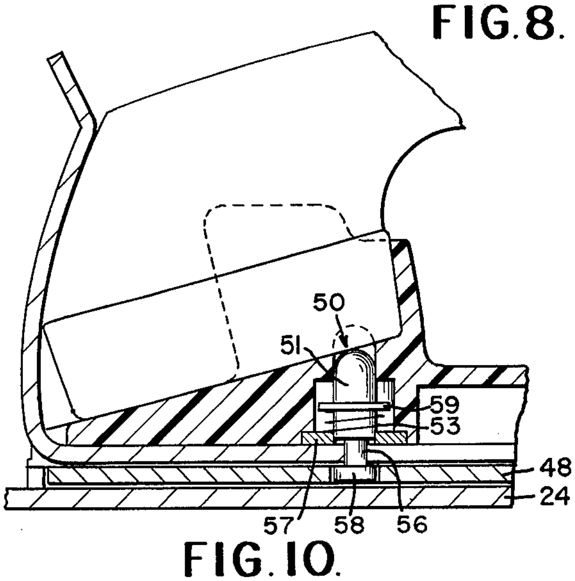
FIG. 10 is an enlarged fragmentary cross-sectional side view of the telephone set shown in FIG. 1.
Figure 11:
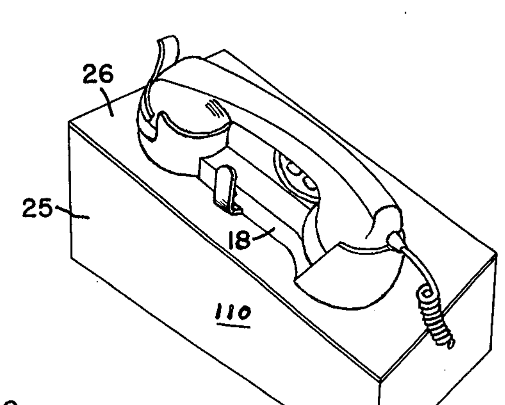
FIG. 11 shows a desk mounted shockproof telephone set in accordance with the invention.

The slide bracket detent means 50 is shown in greater detail in an enlarged cross-sectional view in FIG. 10. The detent means 50 provides for easy endwise ingress and egress of the handset 11 into and out of the cradles 19 and 20 by retaining the wedge portion or retainer portion 29 in an open position as shown in FIGS. 5–7. The detent means 50 includes a plunger pin 51 slideably disposed in the upper cradle 19 and frame 18 normal to the frame longitudinal axis 22 and a spring 53 for biasing the plunger pin 51 into the cradle 19 as shown in FIG. 10. The slide bracket portion 28 includes a key slot 52 disposed along the longitudinal axis 22 of the frame 18 (FIGS. 4 and 7). The key slot 52 includes a round hole 55 communicating with an elongated slot 54 which has a width less than the diameter of the round hole 55. The plunger pin 51 is disposed within the key slot 52 and includes a round neck portion 56 which has a diameter less than the width of the slot 54 and a round detent portion 58 which has a diameter slightly less than the round hole 55 but greater than the width of the slot 54 so that the detent portion 58 can enter the round hole 55 so that the plunger pin 51 can enter the upper cradle 19 as shown by dotted line in FIG. 10. The structure of the plunger pin 51 as just mentioned also provides for the retention of the wedge portion or retainer portion 29 in the open position as shown in FIGS. 5, 6 and 7, since the pin 51 is stationary with respect to the frame 18 and within a bushing 57 fixed to the frame 18. A ring 59 around the pin 51 limits the travel of the pin 51 into the upper cradle 19. The neck portion 56 is spaced from the end of the pin 51 such that when the handset 11 is seated fully within the upper cradle 19, the neck portion 56 is disposed in the slot 54 and the detent portion 58 is out of the round hole 55 thus permitting the spring 32 to return the wedge portion 29 to the closed position as shown in FIGS. 1, 2, 3, 4 and 10 and conversely when the handset 11 is removed from the cradle 19 the detent portion 52 is in the round hole 55. It may now be seen that the length of the slot 54 determines the space between the wedge portion or retainer portion 29 and the upper cradle 19. Thus the round hole 55 is a predetermined position on the slide bracket 28 with respect to the pin 51 such that the wedge portion or retainer portion 29 is in an open position when the plunger pin 51 is disposed in the round hole 55.

The slide bracket 27 is retained within the channel 31 by back plates 47 and 48 which are spaced apart for slideably receiving member 43 therebetween. The back plates 47, 48 are fastened to the frame 18 by screws 49.

The telephone set 10 also includes a hookswitch 60 which includes a cam 61 pivotally mounted in the cradle 21 on a pin 62 fixed to the frame 18. The hook switch 61 includes an insulated pin 63 which moves contact springs (not shown) to enable necessary electrical connections and disconnect other electrical connections (not shown) well known to those skilled in the art. The cam 61 is biased towards the cradle 21 by a spring (not shown) disposed in a bore 65 within the frame 18. A stop member 64 limits the travel of the cam 61 into the lower cradle 21 and the transmitter end 13 pushes the cam 61 towards the frame 18 when placed therein to operate the aforesaid hookswitch.

In describing the operation of the telephone set 10, reference is first made to FIGS. 1–4 and 10 which show the telephone handset 11 at rest in a secured, locked, closed position within the upper cradle 19 and lower cradle 21. When the handset 11 is disposed in this position, the wedge portion or retainer portion 29 of the slide bracket 27 locks and wedges the handset 11 in the cradles 19 and 21. The locking of the handset 11 in the upper and lower cradles 19, 21 is further effected by the bracket lockiing means 40 which locks the slide bracket 27 and wedge portion or retainer portion 29 in the closed position. The spring 32 also acts on the slide bracket 27 to urge it downward to further secure the telephone handset 11 in the cradles 19, 21. Accordingly, to remove the handset 11 from the cradles 19 and 21, the slide member 43 of the bracket locking means 40 is pushed towards the frame 18 and in turn the pin 42 is laterally removed from the notch 41 of the slide bracket 27 so that the only force acting on the slide bracket 27 is the downward pull of the spring 32 which can be overcome by an upward endwise movement of the handset 11. By this upward endwise movement of the handset 11, the wedge portion or retainer portion 29 of the slide bracket 27 is also moved along the longitudinal axis 22 of the frame until it is disposed in a predetermined open position which is achieved when the plunger pin 51 enters the upper cradle 19 and the detent portion 58 of the plunger pin 51 is disposed in the round hole 55 of the key slot 52. The detent portion 58 of the plunger pin 51 when disposed in the round hole 55 holds the wedge portion or retainer portion 29 in the open position so that the handset 11 can be removed from the telephone set 10.

If desired, the telephone handset 11 may be returned to its upper cradle 19 and lower cradle 21 for locking and securing it therein in accordance with the inventions, by placing the handset 11 with its longitudinal axis in alignment with the frame longitudinal axis 22 and sliding the handset 11 endwise into the upper and lower cradles 19, 21. By this action, the receiver 15 at end 16 pushes the plunger pin 51 into the frame 18 out of the upper cradle 19, and in turn the detent portion 58 of the plunger pin 51 is removed from the round hole 55. When the detent portion 58 is removed from the round hole 55, the slide bracket 27 is free to travel downward along its channel 31 and is pulled downward by the spring 32. The wedge portion or retainer portion 29 of the slide bracket 27 transmits the force exerted by the spring 32 upon the handset 11 through its longitudinal axis to seat and wedge the handset 11 in the upper and lower cradles 19, 21. The neck portion 56 of the plunger pin 51 is disposed in the elongated slot 52 when the slide bracket 27 is removed from the predetermined closed position and thus the plunger pin 51 is not disposed in the upper cradle 19 during this removal. The detent portion 58 during this removal is placed behind the slide bracket 27. When the notch 41 of the slide bracket 27 is disposed along the pin 42 and the cupped hand portion 29 is disposed in the closed position, the pin 42 enters the notch 41 since the pin 41 on the slide member 43 is constantly urged toward the slide portion 28 and notch 41 by spring 44. Thus, when the pin 41 is in the notch 42, the wedge portion or retainer portion 29 locks the handset 11 in upper cradle 19 and lower cardle 21 so as to withstand vibration, shock or jarring from some external force. Thus, it may be seen that handset 11 may be removed from the telephone set 10 by merely pushing the slide member 43 of the bracket locking means 40 with one hand and moving the handset 11 endwise against the wedge portion 29 as aforesaid to repeat the operation of removing the handset 11.

Referring now to FIG. 11, another telephone set 110 in accordance with the invention is shown. The telephone set 110 is similar to the telephone set 10 except that it is horizontally mounted on a base 25 and plate 26 which are inclined to facilitate the dialing of telephone numbers with a dial 9 and for the removal of the handset 11 from the frame 18. Aside from the base 25, all the elements of the telephone set 10 are similar to the telephone set 110 and therefore all the like elements in the various figures have like designations and numerals. The telephone set 110 also operates in the same manner as the telephone set 10.

The telephone set 10 has another advantage in that the lower cradle 21 may support the handset 11 and receiver end 16 as shown in FIG. 5. This may be an advantage when it is necessary to temporarily leave the handset 11 on the cradle 21, such as for example, when temporarily placing the phone back on the frame 18 while performing another function or duty.

Other modifications and variations of the described specific embodiments will be apparent to those skilled in the art. Accordingly, it is understood that the described specific examples of the present invention are presented merely by way of example to facilitate a complete understanding of the invention, and such modifications, changes or variations as are embraced by the spirit and scope of the appended claims, are contemplated as within the purview of the present invention.

What is claimed is:

1. A shockproof telephone set comprising:

a. a handset having a longitudinal handle with a transmitter unit at one end and a receiver at the other end thereof disposed along a given longitudinal handset axis, b. a frame having at least one cradle disposed along a given frame axis for cradling said one end of said handset therein, i. said frame having a longitudinal channel along said frame axis, and c. a slide bracket means including a slide portion slideable in said channel of said frame along said frame axis and a retainer portion moveable in cooperative relationship with said one cradle and said other end of said handset for yieldingly urging said handset into said one cradle and against said frame, i. said slide bracket means includes a biasing spring connected to said frame and to said slide portion for urging said retainer portion towards said other end of said handset and said cradle so that said handset is yieldingly urged along said handset longitudinal axis against said frame and said cradle.

2. The invention defined in claim 1 further including bracket locking means positioned in cooperative relationship with said slide bracket means for automatically locking said retainer portion in a closed position so that said handset is locked between said retainer portion and said one cradle when disposed therebetween, i. said bracket locking means includes release means for operatively unlocking said retainer portion so that said handset is moveable in an endwise direction against said retainer portion for removing said handset endwise from said cradle.

3. In a telephone set, the combination comprising:

a. a telephone handset having a longitudinal handle with a receiver unit at one end and a transmitter unit on the other end thereof disposed along a given longitudinal axis of said handset, b. a frame having at least one cradle disposed along a frame longitudinal axis for cradling one end of said handset therein, i. said frame having a channel disposed along said frame longitudinal axis, c. a slide bracket having a slide portion slideably disposed within said channel of said frame and a retainer portion positioned in cooperative relationship with said one cradle for yieldingly urging said handset into said one cradle and against said frame, and d. a spring coupled between said frame and said slide portion of said slide bracket for spring biasing said retainer portion towards said one cradle so that said handset is longitudinally urged at said ends thereof into said one cradle and against said frame.

4. The invention defined in claim 3 further including a second cradle disposed along said longitudinal axis of said frame and spaced from said one cradle to receive the other end of said handset therein so that said retainer portion urges said handset into said one cradle and said second cradle.

5. The invention defined in claim 3 further including slide bracket locking means coacting with said slide bracket for locking said retainer portion in a closed position.

6. The invention defined in claim 5 wherein said slide bracket locking means includes a slide member slideable in a direction transverse to said slide bracket and includes a pin which coacts with a notch in said slide bracket for locking said retainer portion in a closed position.

7. The invention defined in claim 3 further including a detent means coacting with said slide bracket for holding said retainer portion in an open position for ingress and egress of said handset into and out of said one cradle, i. said detent means having a slideable plunger pin disposed in said frame for releasing said retainer portion to a closed position in response to said handset being returned to said one cradle.

8. The invention defined in claim 7 wherein said detent means coacts with a key slot in said slide portion of said slide bracket for retaining said retainer portion in an open position.

* * * * *